(12) United States Patent
Matsuzaki

(10) Patent No.: US 10,194,042 B2
(45) Date of Patent: Jan. 29, 2019

(54) IMAGE FORMING APPARATUS, METHOD FOR CONTROLLING IMAGE FORMING APPARATUS, IMAGE PROCESSING SYSTEM, AND STORAGE MEDIUM

(71) Applicant: CANON KABUSHIKI KAISHA, Tokyo (JP)

(72) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/496,873

(22) Filed: Apr. 25, 2017

(65) Prior Publication Data
US 2017/0318172 A1 Nov. 2, 2017

(30) Foreign Application Priority Data
Apr. 28, 2016 (JP) ................. 2016-091621

(51) Int. Cl.
| G06K 15/00 | (2006.01) |
| H04N 1/04 | (2006.01) |
| H04N 1/00 | (2006.01) |
| H04N 1/387 | (2006.01) |
| G06K 15/12 | (2006.01) |
| G03G 15/00 | (2006.01) |
| G03G 15/01 | (2006.01) |
| H04N 1/409 | (2006.01) |
| H04N 1/60 | (2006.01) |

(52) U.S. Cl.
CPC ......... *H04N 1/00681* (2013.01); *G03G 15/01* (2013.01); *G03G 15/607* (2013.01); *G06K 15/129* (2013.01); *H04N 1/0009* (2013.01); *H04N 1/387* (2013.01); *H04N 1/4097* (2013.01); *H04N 1/6033* (2013.01); *G03G 15/0189* (2013.01); *G03G 2215/00164* (2013.01); *G03G 2215/0436* (2013.01); *G03G 2215/0439* (2013.01); *H04N 2201/0094* (2013.01)

(58) Field of Classification Search
CPC .. H04N 1/00681; H04N 1/0009; H04N 1/387; G03G 15/01; G03G 15/607; G03G 15/0189; G06K 15/129
USPC ............................... 358/488, 3.26, 406, 504
See application file for complete search history.

(56) References Cited

U.S. PATENT DOCUMENTS

| 2003/0048326 A1* | 3/2003 | Yamasaki | .................. B41J 2/15 347/41 |
| 2006/0109522 A1* | 5/2006 | Wang | ................... H04N 1/4097 358/463 |
| 2017/0318172 A1* | 11/2017 | Matsuzaki | ......... H04N 1/00681 |

FOREIGN PATENT DOCUMENTS

JP 2015-103909 A 6/2015

\* cited by examiner

*Primary Examiner* — Cheukfan Lee
(74) *Attorney, Agent, or Firm* — Canon U.S.A., Inc. I.P. Division

(57) ABSTRACT

An image forming apparatus includes an image forming unit configured to form a predetermined pattern image on a sheet, a notifying unit configured to provide a notification of an orientation for placing the sheet on which the predetermined pattern image is formed by the image forming unit, on a placement portion, a reading unit configured to read the sheet on a line to line basis, to generate image data, and a detection unit configured to detect a streak-shaped image extending in a direction along a predetermined edge of the sheet, by analyzing the image data generated by reading the sheet by the reading unit, wherein the notifying unit provides a notification of a placement orientation for allowing the sheet, on which the predetermined pattern image is formed, to be read on a line to line basis, the line extending in a direction along the predetermined edge.

14 Claims, 14 Drawing Sheets

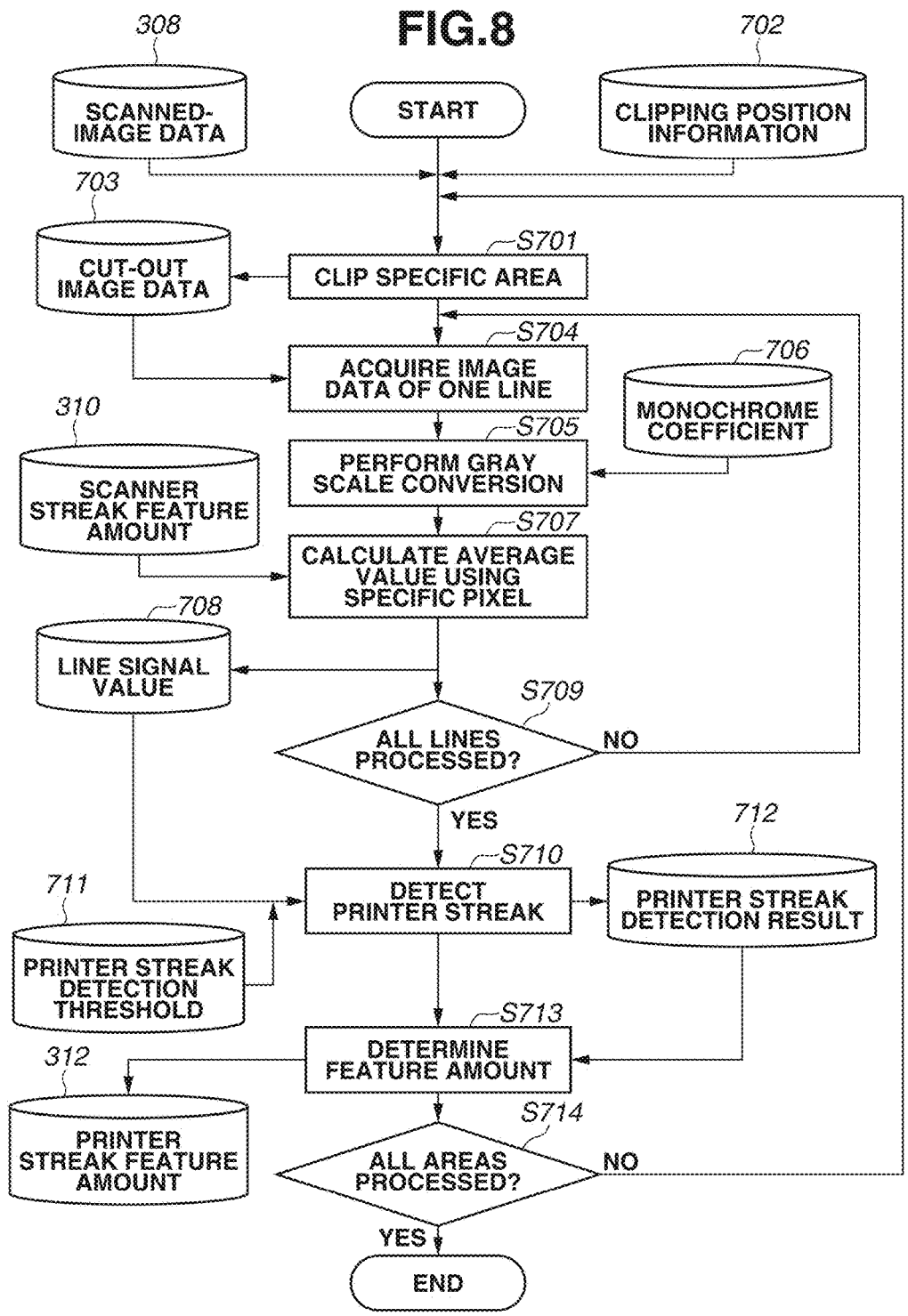

IMAGE FORMING APPARATUS, METHOD FOR CONTROLLING IMAGE FORMING APPARATUS, IMAGE PROCESSING SYSTEM, AND STORAGE MEDIUM

BACKGROUND OF THE INVENTION

Field of the Invention

The present invention relates to an image forming apparatus, a method for controlling an image forming apparatus, and a storage medium.

Description of the Related Art

Use of an image forming apparatus for a long time without maintenance, such as component replacement, may lead to deterioration in components including a developing device, a photosensitive member, and a cleaning member resulting in a defection. Examples of the defection include a streak which appears on a printed image and extends in a direction perpendicular to the side of a leading edge in a paper conveyance direction during printing (first direction).

The defection, such as the streak in the first direction appeared in printing, may be detected by the following method. When a user notices the presence of a defection, such as a streak in a printed image, the user prints a chart for defection detection as illustrated in FIG. 13A, and reads the printed chart with a scanner. A defection, such as streaks 406 to 409 extending in a first direction 410, appears in the printed chart. The image forming apparatus analyzes, based on image data obtained by reading the printed chart, the position and size of a defection appeared in the image data, and estimates a cause of the defection.

When the chart is read with the scanner, a line parallel to a line sensor of the scanner is used as a reading line, and image data is acquired for each line. Then, a defection, such as a streak due to dust or dirt, appears in a direction perpendicular to the reading line, if the dust or dirt is present on a platen glass or a reading portion of the scanner. For example, assume that the image forming apparatus has an auto document feeder (ADF) and a sheet feeding tray 26 as illustrated in FIG. 12A, and an original document 80 is placed in such a manner that a long side 81 of the original document 80 is parallel to the reading line, and the original document 80 is scanned. The original document 80 is conveyed in a direction 82 perpendicular to the reading line, and an image is read on a line to line basis. In a case where dust or dirt is present on the platen glass or the reading portion at this time, a streak 83 extending in a direction perpendicular to the reading line appears in image data obtained by reading the original document 80.

As described above, the image data obtained by reading the chart includes both of the streak in the first direction appeared during printing, and the streak in the direction perpendicular to the reading line appeared during scanning. Accordingly, to estimate a cause of the streak in the first direction appeared during printing, it is necessary to detect the streak in the first direction appeared during printing from the image data obtained by reading the printed chart.

Japanese Patent Application Laid-Open No. 2015-103909 discusses a related method. In this method, image data obtained by scanning a blank sheet and image data obtained by scanning a chart are compared with each other. A streak appeared in the image data obtained by scanning the blank sheet is determined to be a streak appeared during scanning, and other streaks are determined to be streaks appeared during printing.

In Japanese Patent Application Laid-Open No. 2015-103909, when a user is prompted to place the printed chart on a sheet feeding tray or a platen glass, the user is not notified of an orientation in which the chart is to be placed. Accordingly, the user may place the chart on the sheet feeding tray or the platen glass in such a manner that the first direction and a reading line of a scanner are perpendicular to each other.

In such a case, when the chart is read with a line sensor of the scanner on a line to line basis, a streak extending in a direction perpendicular to the reading line may appear in the same direction as a streak in the first direction appeared during printing.

For example, assume that the streaks 406 to 409 formed in the first direction 410 are detected as illustrated in FIG. 13A. The chart is placed in such a manner that the first direction 410 is perpendicular to the reading line, and then the chart is scanned. In the read image, a streak 414 to be formed during scanning appears in the same direction as the streaks 406 to 409 extending in the first direction, as illustrated in FIG. 13B.

Here, in a case where the position of a streak in the first direction appeared during printing and the position of dust or dirt on a portion, such as the reading portion of the scanner, are the same, the streak in the first direction appeared during printing and a streak in a direction perpendicular to the reading line appeared during scanning are positioned on the same straight line. In such a case, the streak, in the first direction, which has formed in the printing and has appeared on the same straight line cannot be detected.

SUMMARY OF THE INVENTION

The present invention is directed to an image forming apparatus including an image forming unit configured to form a predetermined pattern image on a sheet, a notifying unit configured to provide a notification of an orientation for placing, on a placement portion, the sheet on which the predetermined pattern image is formed by the image forming unit, a reading unit configured to read the sheet placed on the placement portion on a line to line basis to generate image data, and a detection unit configured to detect a streak-shaped image extending in a direction along a predetermined edge of the sheet, by analyzing the image data generated by reading the sheet by the reading unit, wherein the notifying unit provides a notification of a placement orientation for allowing the reading unit to read the sheet on a line to line basis, the line extending in a direction along a predetermined line along which the detection unit performs detection.

Further features of the present invention will become apparent from the following description of exemplary embodiments with reference to the attached drawings.

BRIEF DESCRIPTION OF THE DRAWINGS

FIG. 8 is a flowchart illustrating processing for detecting a streak caused by a printer, according to the first exemplary embodiment.

DESCRIPTION OF THE EMBODIMENTS

A first exemplary embodiment of the invention will be described in detail below with reference to the drawings.

In the present exemplary embodiment, a user is notified of a placement orientation for a chart to be scanned so that a direction perpendicular to the side of a leading edge in a paper conveyance direction during printing of the chart (first direction) is parallel to a reading line. This configuration prevents a streak, extending in the first direction, appearing during printing and a streak, extending in a direction perpendicular to the reading line, to appear during scanning from appearing in the same direction. Accordingly, the streak, extending in the first direction, appearing during printing and the streak, extending in the direction perpendicular to the reading line, to appear during scanning are prevented from appearing on the same straight line, so that the streak extending in the first direction appearing during printing is detected.

Figure 1:
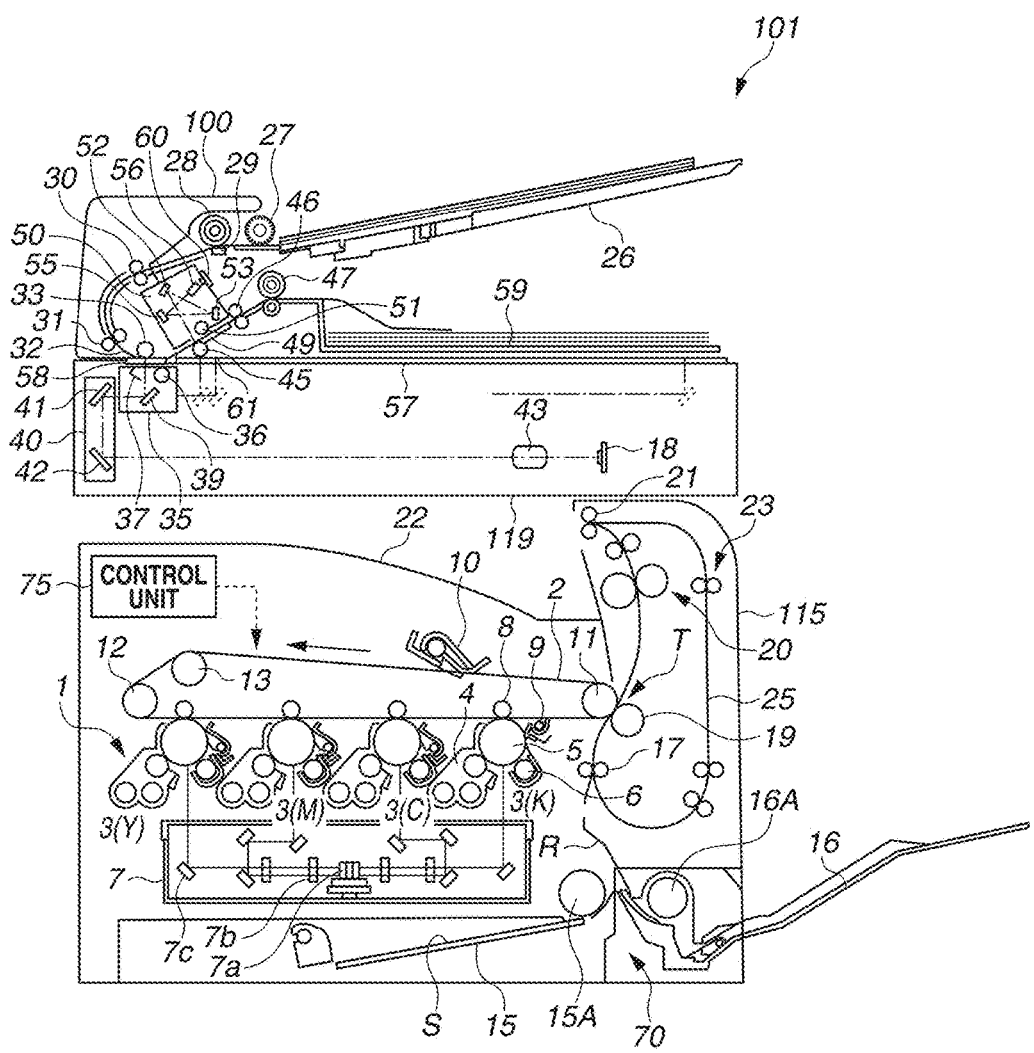
FIG. 1 is a diagram illustrating a configuration of an image forming apparatus according to a first exemplary embodiment.

FIG. 1 is a diagram illustrating a schematic configuration of a multi function printer (MFP) providing full color printing, which is an example of an image forming apparatus according to the present exemplary embodiment. The image forming apparatus according to an exemplary embodiment may be a monochrome MFP.

FIG. 1 illustrates an MFP 101 providing full color printing. The MFP 101 is as an example of the image forming apparatus. A printer 115 functions as a printing unit in the present exemplary embodiment. The printer 115 includes an image forming unit 1 for forming an image on a sheet, and a scanner 119 disposed on the top surface of the printer 115. The printer 115, further includes a paper feeding cassette 70 disposed at a lower part thereof. The paper feeding cassette 70 feeds a sheet to the image forming unit 1.

The image forming unit 1 has four process units 3 (Y, M, C, and K) that form a yellow (Y) toner image, a magenta (M) toner image, a cyan (C) toner image, and a black (K) toner image, respectively, on a transfer belt 2, which is an intermediate transfer belt (ITB). The process units 3 are arranged in series in order of Y, M, C, and K from the upstream side of a conveyance direction of the transfer belt 2. The process units 3 each include a developing device 4 containing toner of a corresponding color, and a photosensitive member 5 that is an image bearing member. The process units 3 have similar structures.

A roller charger 6 is disposed near a photosensitive member 5 of a process unit 3 to face the surface of the photosensitive member 5 in a direction orthogonal to a movement direction of the photosensitive member 5. The roller charger 6 applies a uniform electric potential to the photosensitive member 5.

A laser scanner 7, disposed below the process units 3, and perform image exposure on the photosensitive members 5. The laser scanner 7 has a polygon mirror 7a and a first image forming lens 7b. The polygon mirror 7a performs deflection scanning of a beam emitted from a laser. The first image forming lens 7b performs spot imaging of a laser beam on a drum. In addition, the laser scanner 7 has a folding mirror 7c for reflecting the laser beam passing through the first image forming lens 7b, in a predetermined direction. The laser scanner 7 has an optical case for supporting and fixing each optical component.

A primary transfer roller 8 is disposed at a position facing the photosensitive member 5 with the transfer belt 2 therebetween. In a case where an image is to be formed in the image forming unit 1, the laser scanner 7 performs image exposure for image data in each of Y, M, C, and K colors onto the photosensitive member 5, and the developing device 4 develops a toner image on the photosensitive member 5. The toner image formed on the photosensitive member 5 is transferred to the transfer belt by application of a voltage to the primary transfer roller 8. After the toner image is transferred, a cleaning device 9 collects the toner remaining on the photosensitive member 5 with a blade. The photosensitive member 5 is rotated clockwise in the front view of FIG. 1, with power from a drive source (not illustrated) or by following the transfer belt 2.

The transfer belt 2 is stretched by a transfer drive roller 11, a tension roller 12, and a following roller 13. The transfer belt 2 is rotated by the transfer drive roller 11 to move in an arrow direction (a counterclockwise direction), and the toner images formed on the photosensitive member 5 are sequentially transferred to be superimposed to form a color image.

The MFP 101 further includes a control unit (controller) 75 for controlling the entire MFP 101 as illustrated in FIG. 1. The control unit 75 includes a central processing unit (CPU) circuit unit having a CPU, a random access memory (RAM), and a read only memory (ROM), which are not illustrated. The CPU performs basic control of the entire MFP 101. The ROM stores control programs for comprehensively controlling the MFP 101. Examples of the control programs include a control program for controlling the scanner 119, and a control program for controlling the image forming unit 1. The RAM is provided to temporarily retain control data, and used as a work area for arithmetic processing accompanying the control.

The paper feeding cassette 70 has a feed cassette 15, and conveys sheets S held in the feed cassette 15 one by one to a conveyance path R with a conveyance roller 15A. This direction in which sheets S are conveyed to the conveyance path R is a paper conveyance direction in printing. The sheets S held on a multiple sheet feeding tray 16 are conveyed to the conveyance path R one by one with a conveyance roller 16A. The sheet S conveyed to the conveyance path R from the paper feeding cassette 70 or the multiple sheet feeding tray 16 is temporarily stopped by a registration roller 17 disposed on a downstream side of the conveyance direction of the conveyance path R. The registration roller 17 starts rotating in time with movement of the color image formed on the transfer belt 2, after temporarily stopping the sheet S. This configuration allows the sheet S to reach a secondary transfer portion T where secondary transfer of the color image is performed with application of a positive transfer bias to a secondary transfer roller 19.

After the secondary transfer of the color image, the sheet S is conveyed from the secondary transfer portion T to a fixing device 20. The fixing device 20 then fixes the color image onto the sheet S by heat and pressure. Here, in the case of the one-sided printing having been set to the image forming operation in the secondary transfer, a discharge roller 21 discharges the sheet S to a paper discharge tray 22 after the fixing in the fixing device 20. In the case of two-sided printing having been set to the image forming operation in the secondary transfer, the discharge roller 21 conveys the sheet S to a reversing unit 23 after the color image is fixed on one side of the sheet S in the fixing device 20. The sheet S conveyed to the reversing unit 23 is flipped over by a both sides path 25, and then the color image is transferred again to the other surface of the sheet S by the secondary transfer roller 19. Afterward, with the color image transferred to the other side of the sheet having been fixed in the fixing device 20, the discharge roller 21 discharges the sheet S to the paper discharge tray 22. A cleaning device 10 then removes the toner remaining on the transfer belt 2 after the secondary transfer to the sheet S.

The scanner 119 includes an auto document feeder (ADF) 100. The ADF 100 can be opened and closed in an up-and-down direction. The ADF 100 has the sheet feeding tray 26 as an original-document placement portion, in an upper part thereof. A feeding roller 27, and a separation conveyance roller 28 as well as a separation pad 29 are disposed in this order near the sheet feeding tray 26. A conveyance roller pair 30 and an upstream lead roller pair 31 are disposed in this order on a conveyance path for conveying a placed original document from the sheet feeding tray 26. Furthermore, disposed downstream thereof in this conveyance direction is a front side reading portion having a platen glass 58.

A front side reading roller 33 including a white roller is disposed above the platen glass 58 in the front view, and an image reading unit 35 is disposed below the platen 32, in FIG. 1. The image reading unit 35 has a lamp 36, a light reflector 37, and a mirror 39. The lamp 36 irradiates the front side of the original document with light. The light reflected from the original document is guided to a lens unit 43 via the mirror 39, and mirrors 41 and 42 included in a mirror unit 40. The guided light is focused by the lens unit 43 on a light receiving portion of a line sensor 18 to form an image, and then photoelectrically converted so that the original image is read. The line sensor 18 used for reading the image includes, for example, an image sensor, such as a charge coupled device (CCD) sensor or a complementary metal oxide semiconductor (CMOS) sensor. The line sensor is fixed in the MFP illustrated in FIG. 1, but the line sensor 18 may be integral with the image reading unit 35, and the line sensor 18 and the image reading unit 35 may be movable in a direction perpendicular to the reading line.

A back side reading roller 45, a downstream lead roller pair 46, and a discharge roller pair 47 are disposed in this order, downstream of the platen glass 58 in the conveyance direction on the conveyance path from the sheet feeding tray 26. The back side reading roller 45 is a white roller. A back side reading unit 50 is disposed between the back side reading roller 45 and the downstream lead roller pair 46. The back side reading unit 50 has a reading portion 49 at a reading position for the back side of the original document.

The back side reading unit 50 has a lamp 51, mirrors 52, 53, and 55, a lens unit 56, and an image sensor 60. The lamp 51 irradiates the back side of the original document with light. The light reflected from the original document is guided to the lens unit 56 via the mirrors 52, 53, and 55. The guided light is focused by the lens unit 56 on a light receiving portion of the image sensor 60 to form an image, and then photoelectrically converted. With this configuration, an original document image is read.

The scanner 119 has a fixed reading mode. In the fixed reading mode, the scanner 119 moves the image reading unit 35 to read an original document placed on a document platen glass 57 (hereinafter may be referred to as the platen glass 57) of the printer 115 by the user. The scanner 119 further has a flow reading mode. In the flow reading mode, an original document placed on the sheet feeding tray 26 is read by the image reading unit 35 remaining stopped at a predetermined position while the original document is being conveyed in a direction toward the platen glass 58 of the printer 115. The document platen glass 57 functions as an original-document placement portion in the fixed reading mode, whereas the sheet feeding tray 26 functions as the original-document placement portion in the flow reading mode.

In the flow reading mode, the scanner 119 conveys the original document placed on the sheet feeding tray 26 toward the platen glass 58 and the reading portion 49. In this conveyance, the feeding roller 27 sequentially feeds sheets of the original document on the sheet feeding tray 26 from the uppermost sheet. The separation conveyance roller 28 and the separation pad 29 separate and feed the sheets of the original document one by one. The conveyance roller pair 30 and the upstream lead roller pair 31 convey the sheets of original document, separately conveyed, to the platen glass 58 provided at a position for reading the front side of the sheet of the original document.

A leading edge of the sheet of the original document to be conveyed to the platen glass 58 is caused to abut on a nip portion of the upstream lead roller pair 31 to form a loop, so that skew collection and leading end registration are performed. The sheet of the original document is then conveyed to the reading portion 49, the position for reading the back side of the original document. Afterward, the downstream lead roller pair 46 and the discharge roller pair 47 discharge the sheet of the original document onto a discharge tray 59.

In the fixed reading mode for reading the original document placed on the platen glass 57, the image reading unit 35 reads the original document, while being moved in a rightward direction in FIG. 1, from an original-document placement reference (not illustrated). At an original-document abutment portion in the flow reading mode, a white reference member 61 is provided on the platen glass 57. The white reference member 61 is a white reference for document scanning with the scanner 119.

Figure 2:
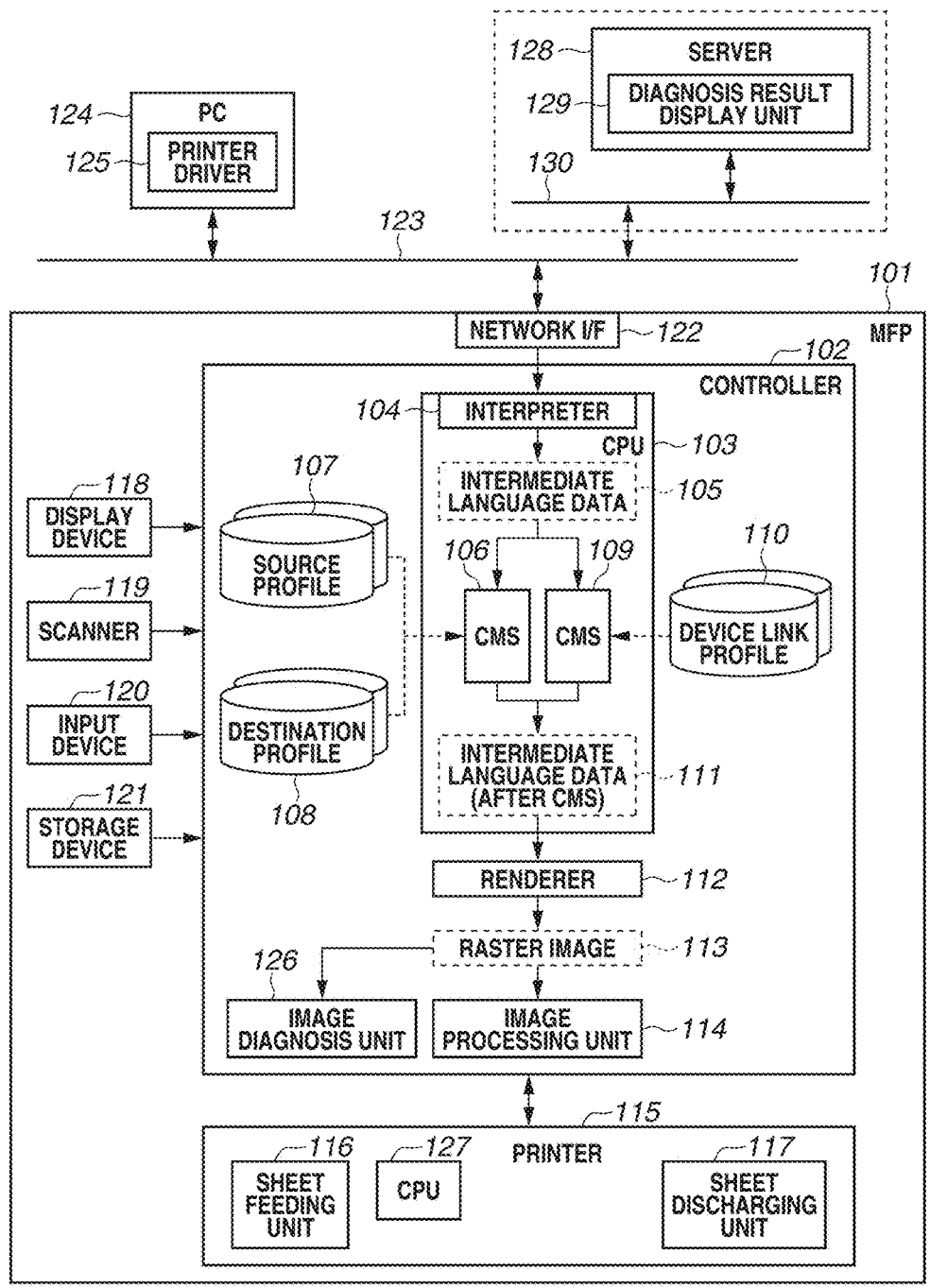
FIG. 2 is a diagram illustrating a configuration of a system of the image forming apparatus according to the first exemplary embodiment.

FIG. 2 illustrates a configuration of a system in the present exemplary embodiment. The MFP 101 with the toners of the four colors of C, M, Y, and K is connected to another network-capable apparatus via a network 123. A personal computer (PC) 124 is connected to the MFP 101 via the network 123. A printer driver 125 in the PC 124 transmits print data to the MFP 101.

The MFP 101 will be described in detail. A network interface (I/F) 122 receives and transmits data such as print data from or to the other network-ready apparatus such as the PC 124 via the network 123. A controller 102 includes a CPU 103, a renderer 112, and an image processing unit 114. An interpreter 104 of the CPU 103 interprets a page description language (PDL) part of the received print data, thereby generating intermediate language data 105.

A (color management system) CMS 106 and a CMS 109 generate intermediate language data (after CMS) 111, by performing color conversion of the intermediate language data 105 using profile information (described below).

The CMS 106 performs the color conversion with a source profile 107 and a destination profile 108 to generate the intermediate language data (after CMS) 111.

The source profile 107 is provided to convert a device-dependent color space, such as RGB and CMYK, into a device-independent color space, such as L*a*b*(hereinafter referred to as Lab) and XYZ defined by the Commission Internationale de l'Eclairage (CIE). XYZ is a device-independent color space similar to Lab, and expresses colors with three types of stimulation value. The destination profile 108 is provided to convert a device-independent color space into a CMYK color dependent on a device such as the printer 115.

The CMS 109 performs the color conversion of the intermediate language data 105 with a device link profile 110 to generate the intermediate language data (after CMS) 111. The device link profile 110 is provided to directly convert a device-dependent color space, such as RGB and CMYK, into a CMYK color space dependent on a device, such as the printer 115.

Either the CMS 106 or the CMS 109 is determined to be used based on a setting in the printer driver 125 performed by the user.

In the present exemplary embodiment, whether to use the CMS 106 or the CMS 109 depends on the type of profile, i.e., the source profile 107, the destination profile 108, and the device link profile 110. However, a plurality of types of profile may be handled by a single CMS. In addition, the types of profile are not limited to the examples described in the present exemplary embodiment. Any type of profile may be used if the profile enables generation of the intermediate language data (after CMS) 111 by conversion into a CMYK color space dependent on a device, such as the printer 115.

The renderer 112 generates a raster image 113 from the generated intermediate language data (after CMS) 111.

The image processing unit 114 performs image processing for the raster image 113 or an image read with the scanner 119. The image processing unit 114 will be described in detail below with reference to FIG. 3.

The printer 115 connected to the controller 102 forms an image on a sheet with the toners of C, M, Y, and K. The printer 115 is controlled by a CPU 127. The printer 115 has a sheet feeding unit 116 and a sheet discharging unit 117. The sheet feeding unit 116 feeds a sheet, and the sheet discharging unit 117 discharges a sheet on which an image is formed according to output data.

A display device 118 displays a screen for displaying an instruction for a user and a screen for notifying the user of a state of the MFP 101, in image diagnosis processing to be described below. Without being limited to the image diagnosis processing, the display device 118 also displays a screen for displaying an instruction for a user and a screen for notifying the user of a state of the MFP 101, when the user sets a function of the MFP 101, such as copying and scanning.

The scanner 119 includes the ADF 100. The scanner 119 irradiates a sheet or a batch of an original document with light using a light source, and forms an image on the line sensor 18 including the solid image sensor, such as a CCD sensor or a CMOS sensor. A line parallel to the line sensor 18 is set as the reading line, and a raster image reading signal is obtained as image data for each line.

An input device 120 is an interface for receiving an input from a user. The input device 120 partially functions as a touch panel, which is integral to the display device 118.

A storage device 121 stores data, such as data processed by the controller 102 and data received by the controller 102.

When an instruction to perform the image diagnosis processing is received from a user, the image diagnosis unit 126 prints a chart for defect image detection. The image diagnosis unit 126 then executes streak-detection and failure-component estimation processing using the raster image 113 obtained by scanning the printed chart, to perform the image diagnosis processing. The processing will be described in detail below.

A server 128 is connected to the MFP 101 via a network 130 and the network 123. FIG. 2 illustrates a case where the server 128 and the MFP 101 are installed in environments away from each other, and connected via a plurality of networks. Examples of such a case include a case where the MFP 101 and the server 128 are installed in different buildings. The MFP 101 and the server 128 may be connected via a plurality of networks as illustrated in FIG. 2, or may be connected via a single network. In the present exemplary embodiment, only the MFP 101 is connected to the server 128. However, the server 128 may be connected to a plurality of MFPs, and the server 128 may manage information about these MFPs. A diagnosis result display unit 129 receives information including an estimation result of a failure component from the image diagnosis unit 126. The diagnosis result display unit 129 then displays the estimation result, for example, a code corresponding to the failure component or a failure, to notify a serviceman of the estimation result.

Figure 3:
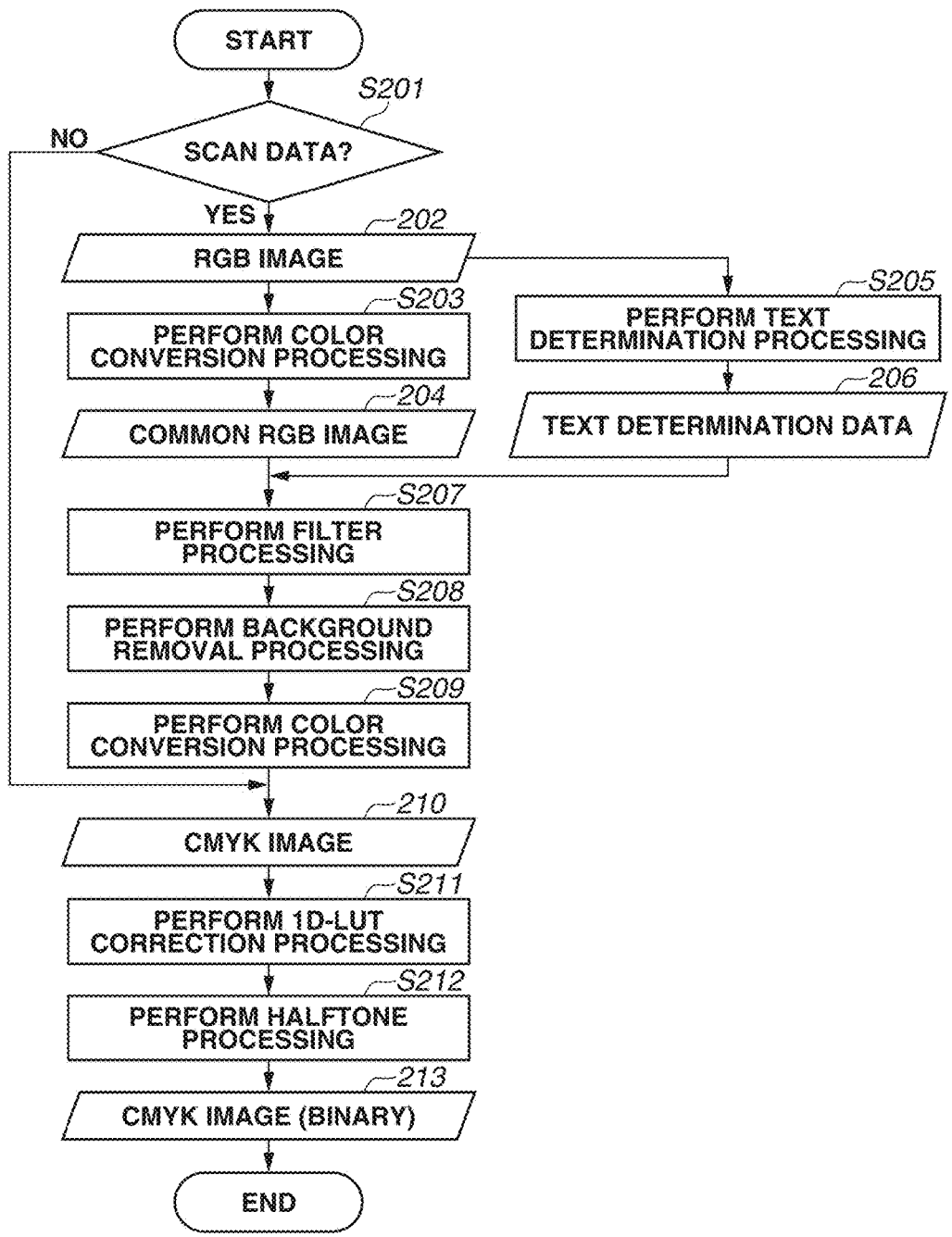
FIG. 3 is a flowchart illustrating image processing.

Now, processing to be performed by the image processing unit 114 will be described with reference to FIG. 3. FIG. 3 illustrates image processing to be performed on the raster image 113 obtained from an image provided from, for example, the PC 124, or on an image read with the scanner 119. The processing illustrated in FIG. 3 is implemented when executed by an application specific integrated circuit (ASIC), not illustrated, in the image processing unit 114.

In step S201, the image processing unit 114 determines whether the received image data is scan data read in with the scanner 119, or the raster image 113 sent from the printer driver 125.

If the image data received by the image processing unit 114 is not the scan data (NO in step S201), the received image data is the raster image 113 bitmapped by the renderer 112. The image processing unit 114 performs the subsequent processing, with determination that the bitmapped raster image 113 is a CMYK image 210 resulting from conversion into a CMYK color space dependent on a printer device performed by the CMS.

If the image data received by the image processing unit 114 is the scan data (YES in step S201), the image processing unit 114 determines that the received image data is an RGB image 202. In step S203, the image processing unit 114 performs color conversion processing on the image data read in with the scanner 119, and generates a common RGB image 204. Here, the common RGB image 204 is defined in an RGB color space independent of a device, and can be converted into a device-independent color space such as Lab by computing.

In step S205, the image processing unit 114 performs text determination processing on the image data of the RGB image 202 read in with the scanner 119, and generates text determination data 206. Here, the image processing unit 114 generates the text determination data 206, by detecting, for example, an edge of an image of the image data read in with the scanner 119.

In step S207, the image processing unit 114 performs filter processing on the common RGB image 204, using the text determination data 206. The filter processing performed using the text determination data 206 by the image processing unit 114 for a text part in the image data is different from that for the other parts.

In step S208, the image processing unit 114 removes a background color component, by performing background removal processing.

In step S209, the image processing unit 114 performs color conversion processing to generate a CMYK image 210.

In step S211, the image processing unit 114 corrects a tone characteristic of a single color of each of C, M, Y, and K, using one-dimensional look up table (LUT) for correcting the color of each of C, M, Y, and K.

In step S212, the image processing unit 114 performs image forming processing (halftone processing) such as screen processing and error diffusion processing, to create an CMYK image (binary) 213, and the processing is completed.

Next, an image for defection detection and scanning of a printed chart in the present exemplary embodiment will be described with reference to FIGS. 4 and 13A.

In response to receiving an instruction to start the image diagnosis processing from a user via the input device 120, the MFP 101 prints an image for defection detection stored in the storage device 121 with the printer 115. The image for defection detection is a predetermined image stored beforehand in the storage device 121. The user uses the printed image for defection detection as a chart.

Figure 13A:
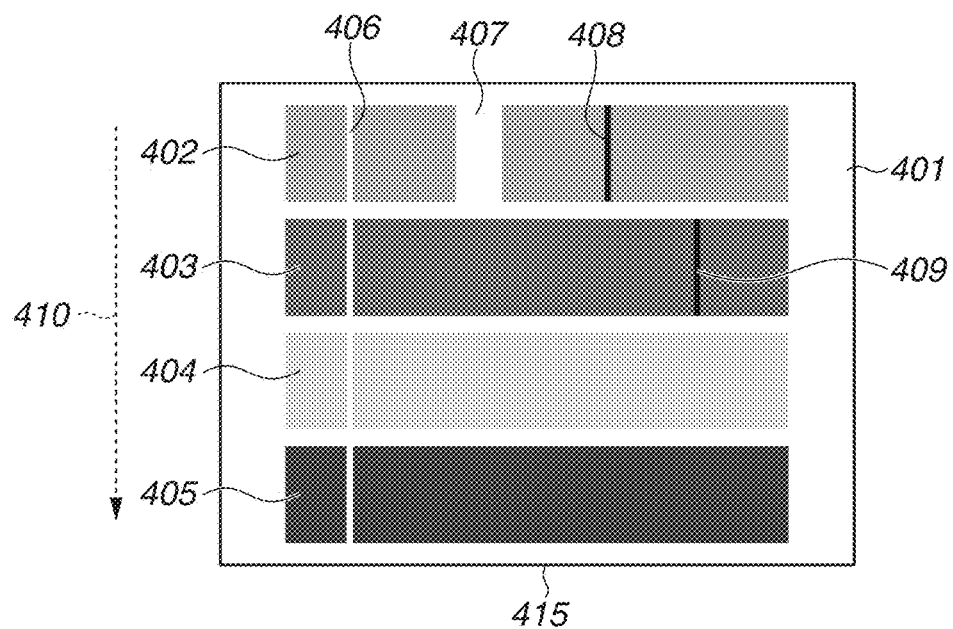
FIGS. 13A and 13B are a diagram illustrating an example of a chart for defection detection, and a diagram illustrating an example of image data obtained by reading the chart with the scanner, respectively, according to the first exemplary embodiment.
Figure 13B:
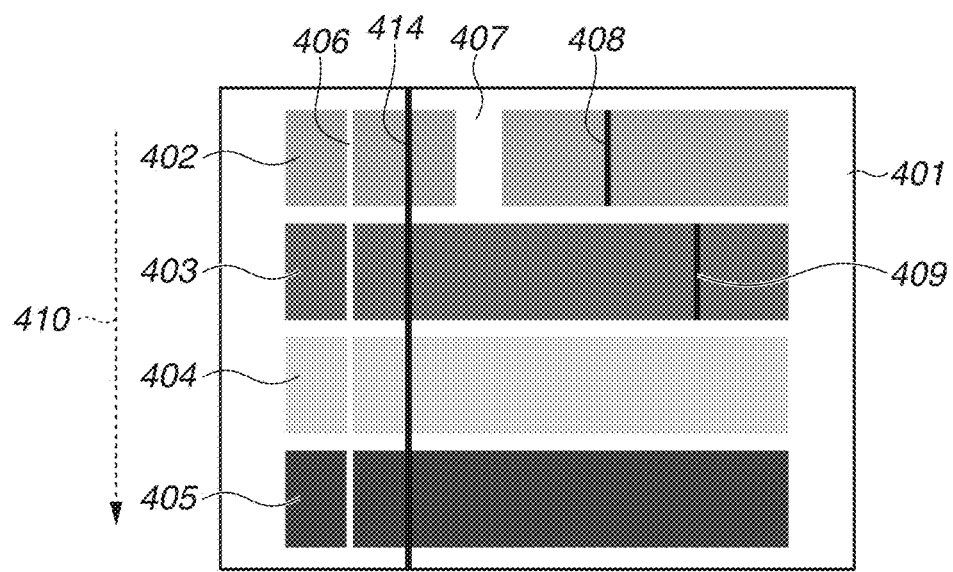

FIG. 13A illustrates an example of the chart obtained by printing the image for defection detection during printing, with a sheet setting of "A4". The example illustrated in FIG. 13A is a chart for detecting, at a time, streaks generated in C, M, Y, and K area. An area 402 is formed with the C toner, an area 403 is formed with the M toner, an area 404 is formed with the Y toner, and an area 405 is formed with the K toner. The toner forming each of these areas has a uniform density.

Streaks 406 to 409 each appear when the image for defection detection is printed. The streak 406 is a streak having a low density and appears in all the C, M, Y, and K areas. The streak 407 is a wide streak having a low density and appears only in the C toner. The streak 408 is a streak having a high density and appears only in the C toner. The streak 409 is a streak having a high density and appears only in the M toner.

A direction 410 is a paper conveyance direction in which a sheet is conveyed during printing. The direction 410 is the first direction perpendicular to a side 415 that is a leading edge in the paper conveyance direction during printing. The streaks 406 to 409 are all formed in the same direction as the first direction 410.

To detect the streaks 406 to 409 appeared in the chart, the user places the printed chart on the sheet feeding tray 26 of the scanner 119, and the printed chart is read in the flow reading mode. The MFP 101 notifies the user of a placement orientation that prevents a streak appearing in a direction perpendicular to the reading line during scanning and a streak appearing in the first direction during printing from appearing in the same direction. The user then places the chart in the notified placement orientation and scans the chart. The placement orientation indicates the orientation in which an original document is to be placed on the sheet feeding tray 26 or the document platen glass 57 when the original document is to be read with the scanner 119.

Figure 4:
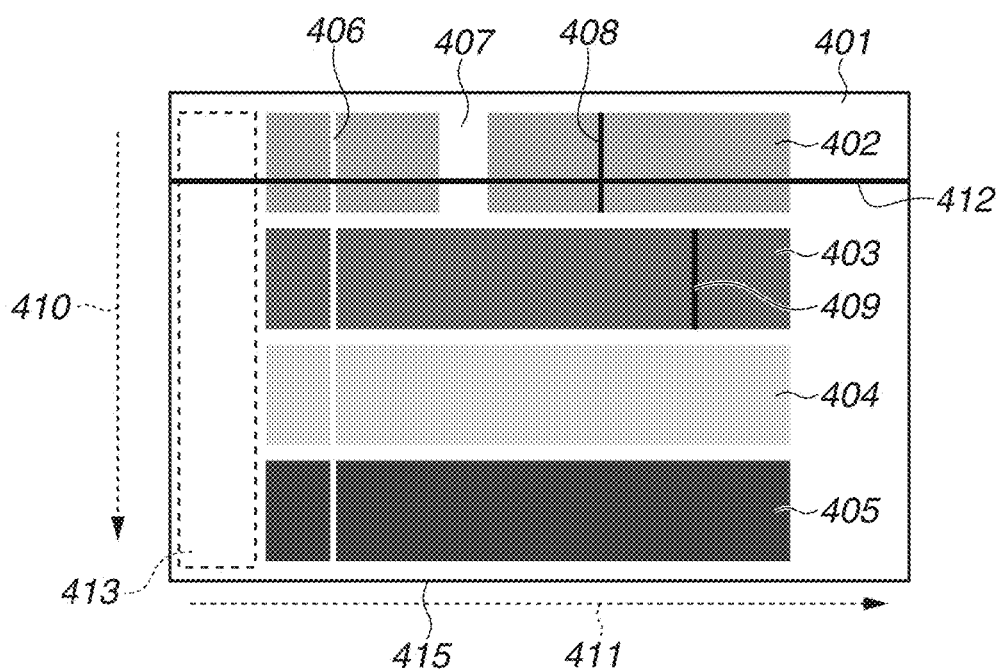
FIG. 4 is a diagram illustrating image data obtained by reading a chart with a scanner to detect an image defection, according to the first exemplary embodiment.

FIG. 4 illustrates image data obtained by scanning the chart illustrated in FIG. 13A with the chart being placed in a placement orientation of "A4R". The placement orientation of "A4R" is an orientation for reading a sheet of A4 size in such a manner that a short side of the sheet is parallel to the reading line.

A direction 411 is a conveyance direction for conveying the chart in the flow reading mode of the scanner 119. The direction 411 is perpendicular to the reading line. A streak 412 is a streak having a high density and appears in a direction perpendicular to the reading line during scanning.

The streak 412 is generated due to dust or dirt on the platen glass 58 of the scanner 119.

As described above, reading of the chart in such a manner that the first direction and the reading line with respect to the chart are parallel to each other prevents a streak appearing in the first direction during printing and a streak appearing the direction perpendicular to the reading line during scanning from appearing in the same direction. Accordingly, the streak appearing in the first direction during printing and the streak appearing in the direction perpendicular to the reading line during scanning can be prevented from appearing on the same straight line.

Now, the image diagnosis processing according to the present exemplary embodiment will be described with reference to FIG. 5.

The image diagnosis processing is started in a case where a defect image is generated and a user issues an instruction to start the image diagnosis processing via the input device 120. The image diagnosis processing is controlled by the image diagnosis unit 126. In the following processing, step S301 to step S316 are implemented by the CPU 103 in the controller 102 executing the processing. Data acquired by the CPU 103 is stored into the storage device 121.

In the present exemplary embodiment, a streak appeared in the first direction during printing of a chart is detected.

First, in step S301, the CPU 103 prints image data 302 for defection detection on the printer 115. The image data 302 for defection detection is stored in the storage device 121. A chart 303 is obtained by printing the image data 302 for defection detection. The CPU 103 stores printing sheet setting information 304 into the storage device 121, when an image for defection detection is printed. The image data 302 for defection detection used in step S301 is the raster image 113 stored in the storage device 121 to be used for printing of the chart 303. The printing sheet setting information 304 indicates a sheet size used in printing of the chart 303, and a paper conveyance direction with respect to a sheet during printing. Examples of the sheet size include "A4", "letter", "A3", and "A4R". In FIG. 5, the printing sheet setting information 304 to be used for printing the chart is stored into the storage device 121 in step S301. However, the printing sheet setting information 304 to be used for printing the chart 303 may be determined beforehand, and the printing sheet setting information 304 determined beforehand may be stored in the storage device 121.

Next, in step S305, the CPU 103 determines a placement orientation for scanning, based on the printing sheet setting information 304 stored in the storage device 121, and notifies the user of the determined placement orientation for scanning. The MFP 101 notifies the user of whether a long side or a short side of an original document to be scanned is to be placed parallel to the reading line. As a way of notifying the user of the placement orientation for scanning, the CPU 103 displays the placement orientation for scanning on the display device 118. The notification of the placement orientation for scanning will be described with reference to FIGS. 6A and 6B.

The placement orientation for scanning is determined in such a manner that the first direction in the chart is parallel to the reading line of the scanner. For example, with the printing sheet setting information 304 being A4, the CPU 103 determines that the placement orientation for scanning is A4R in which the short side of the chart is to be parallel to the reading line. As a result, the first direction 410 in the chart and the direction 411 perpendicular to the reading line in scanning are perpendicular to each other. This configuration can prevent a streak appearing in the first direction during printing and a streak appearing in a direction perpendicular to the reading line during scanning from appearing in the same direction.

As described above, the placement orientation for scanning is determined based on the printing sheet setting information 304 in step S305. However, in a case where the printing sheet setting information 304 determined beforehand is stored in the storage device 121, the placement orientation for scanning may be also stored beforehand in the storage device 121. In such a case, the CPU 103 calls the placement orientation stored in the storage device 121 in step S305, and then notifies the user of the called placement orientation.

In step S306, the CPU 103 determines whether the placement orientation of the original document is set to the specified placement orientation. With the ADF 100 of the scanner 119, the CPU 103 determines whether a guide at a part where the original document is to be placed is set to the specified placement orientation. How the CPU 103 determines whether the placement orientation of the original document is set to the specified placement orientation is not limited to the method described above. For example, if scanning is performed with the document platen glass 57, the CPU 103 may determine whether the placement orientation corresponds to the specified orientation, by determining the size and the orientation of the original document placed on the document platen glass 57.

If the CPU 103 determines that the placement orientation of the original document is set to the specified placement orientation (YES in step S306), the processing proceeds to step S307. In step S307, the CPU 103 executes scanning with the scanner 119, in response to scan starting operation of the user performed on the input device 120. The CPU 103 then stores scanned-image data 308 obtained by the scanning into the storage device 121.

In step S309, the CPU 103 executes processing for detecting a streak appearing during scanning (scanner streak detection processing) using the scanned-image data 308, and obtains a scanner streak feature amount 310. The CPU 103 stores the obtained scanner streak feature amount 310 into the storage device 121. The processing for detecting the streak appeared during scanning will be described below with reference to FIG. 7.

In step S311, the CPU 103 executes processing for detecting a streak appeared during printing (printer streak detection processing) using the scanner streak feature amount 310, and obtains a printer streak feature amount 312. The CPU 103 stores the obtained printer streak feature amount 312 into the storage device 121. The processing for detecting the streak appearing during printing will be described below with reference to FIG. 8.

In step S313, the CPU 103 performs processing for estimating a failure component causing a streak (failure component estimation processing) using the printer streak feature amount 312 and failure component estimation information 314, and outputs a failure component estimation result 315 to the storage device 121. The failure component estimation processing will be described below with reference to FIG. 11.

In step S316, the CPU 103 provides a notification of an image diagnosis result using the failure component estimation result 315. The CPU 103 instructs the diagnosis result display unit 129 of the server 128 connected via the network 123 or the display device 118 of the MFP 101 to display the image diagnosis result. The CPU 103 transmits information, such as a code corresponding to a component likely to be failed, to the server 128 or the display device 118 of the MFP 101. The failure component estimation result 315 is displayed on the diagnosis result display unit 129 of the server 128 or on the display device 118 of the MFP 101 to notify a user or a serviceman of the image diagnosis result. Since the MFP 101 notifies the user or the serviceman of, for example, the diagnosis result or code, the serviceman can determine presence or absence of a failure and take measures beforehand, without visiting the site.

The notification of the placement orientation of the original document for scanning described with reference to step S305 and step S306 of the flowchart illustrated in FIG. 5 Will be described with reference to FIGS. 6A and 6B. FIGS. 6A and 6B each illustrate an example of a screen for notifying the placement orientation of the original document for scanning, to be displayed on the display device 118. A screen 501 is a screen for notifying the user of the placement orientation of the original document for scanning. In FIGS. 6A and 6B, the chart illustrated in FIG. 13A is to be printed with a page setting of "A4", and the screen 501 notifies the user of a placement orientation of "A4R" for scanning. FIG. 6A illustrates an example of a screen to be displayed on the display device 118 in a case where the placement orientation of the original document is not set as notified, i.e., in a case where the result of the determination in step S306 in FIG. 5 is "NO". In a case where the placement orientation of the original document is not set as notified, the CPU 103 grays out a "start reading" button 502 to prevent this button from being pressed so that scanning cannot be executed. This configuration prevents the user from scanning of the chart in a placement orientation different from the placement orientation notified by the CPU 103.

Figure 5:
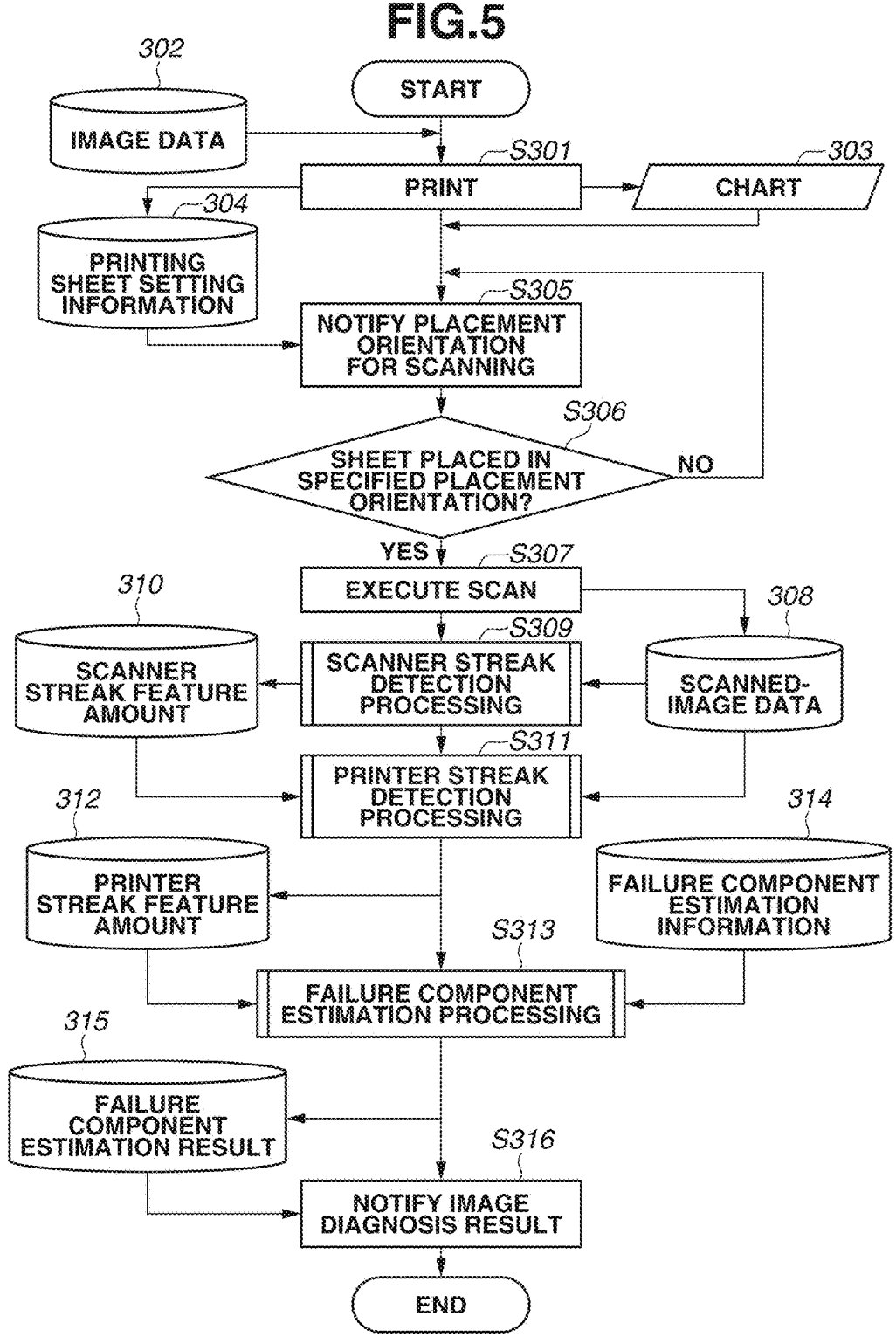
FIG. 5 is a flowchart illustrating image diagnosis processing according to the first exemplary embodiment.
Figure 6A:
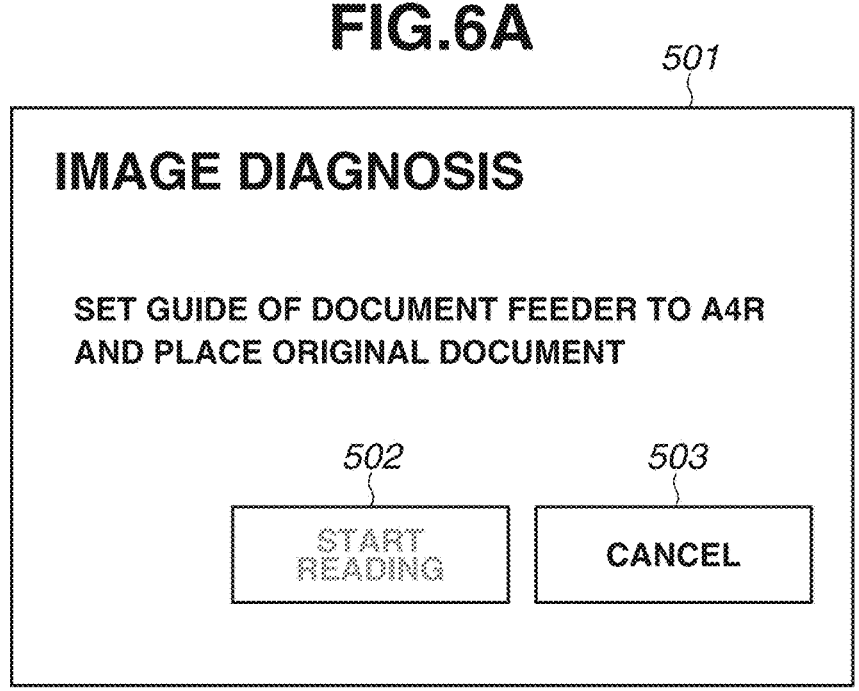
FIGS. 6A and 6B are diagrams each illustrating an example of a screen to be displayed on a display device at the time of notification of setting for scanning a chart according to the first exemplary embodiment.
Figure 6B:
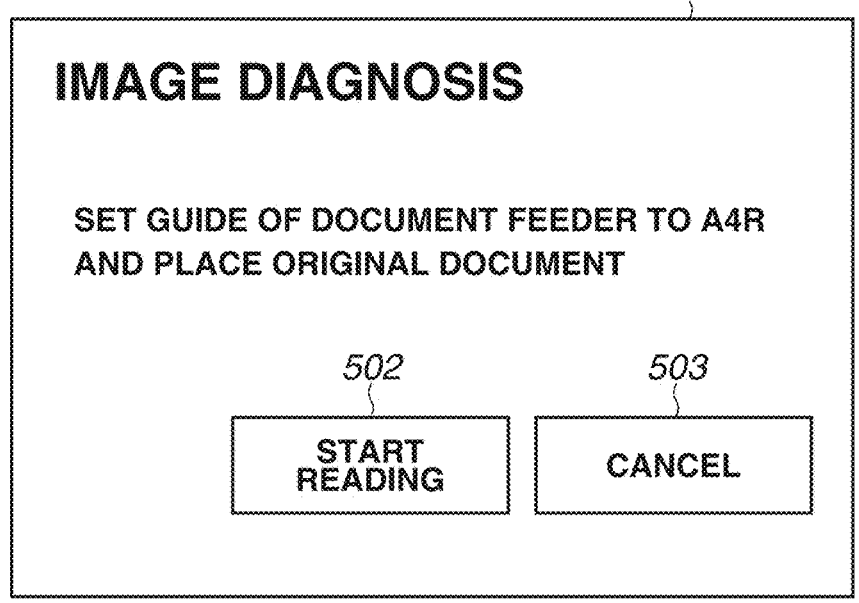

FIG. 6B illustrates an example of a screen to be displayed in the display device 118, in a case where the placement orientation of the original document is changed to the notified placement orientation, i.e., in a case where the result of the determination in step S306 in FIG. 5 is "YES". In a case where the placement orientation of the original document is set as notified, the CPU 103 enables the "start reading" button 502 to be pressed so that scanning can be executed. The screen illustrated in each of FIGS. 6A and 6B includes a cancel button 503. The cancel button 503 is used to stop the image diagnosis processing. The image diagnosis processing is stopped with the cancel button 503 being pressed by the user.

In FIGS. 6A and 6B, the "start reading" button 502 for execution of scanning cannot be pressed with the placement orientation of the original document being different from the orientation displayed on the screen. Alternatively, even if the placement orientation of the original document is different from the notified orientation, the "start reading" button 502 may be pressed without being grayed out. In this case, in a case where the "start reading" button 502 is pressed by the user with the setting of a reading size different from a notified reading size, the user may be prompted to set the correct reading size and then press the "start reading" button 502 again.

The method for notifying the placement orientation of the original document for scanning is not limited to the method for displaying the screen as illustrated in each of FIGS. 6A and 6B on the display device 118. Any method may be adopted if the method can notify the user of the placement orientation of the original document for scanning of the printed chart. For example, a moving image or an animation may be displayed on the display device 118 to notify the user of the placement orientation of the original document for scanning. Alternatively, an audio message may be provided to notify the user of the placement orientation of the original document for scanning.

Figure 7:
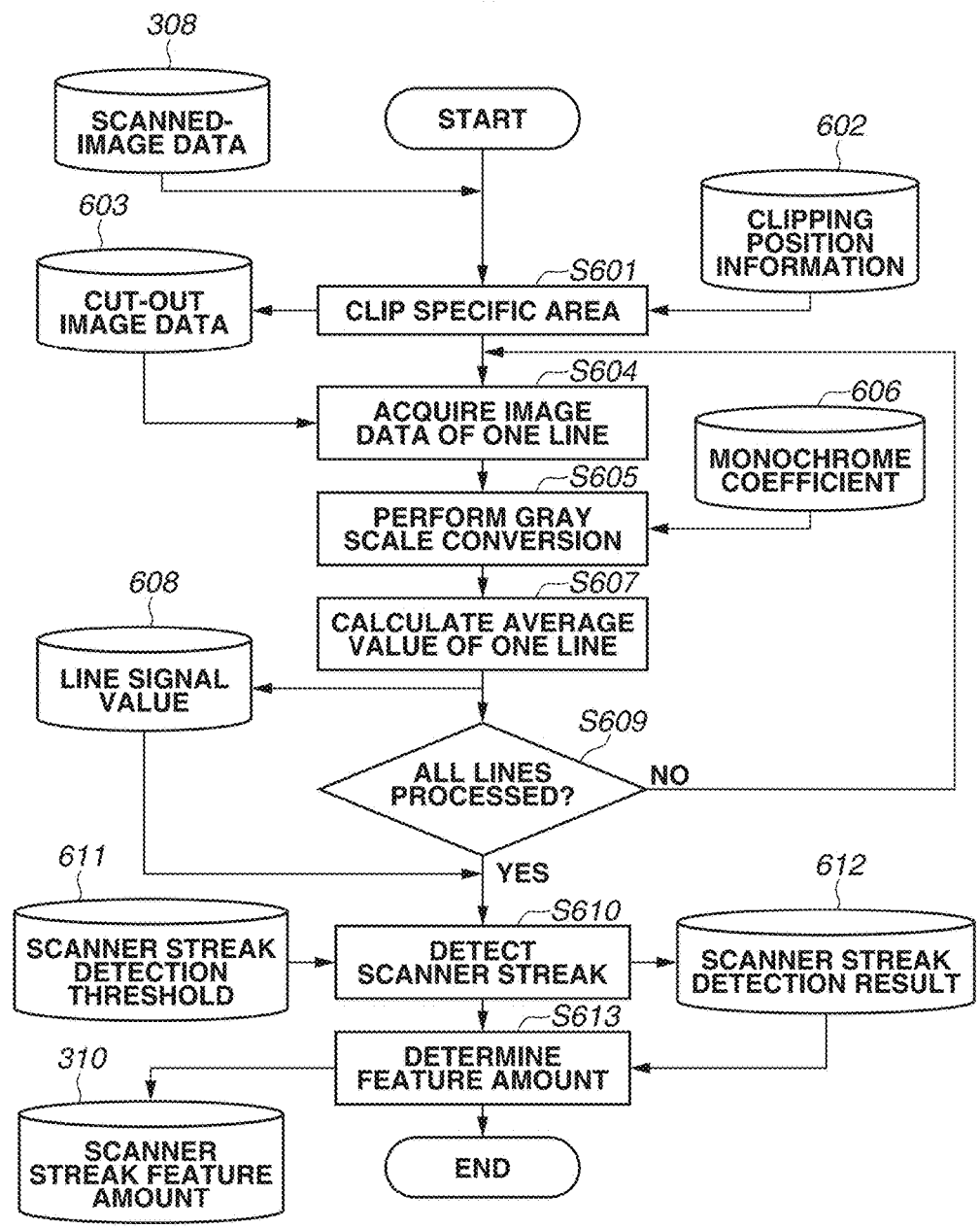
FIG. 7 is a flowchart illustrating processing for detecting a streak caused by the scanner, according to the first exemplary embodiment.

The scanner streak detection processing in step S309 in FIG. 5 will be described in detail with reference to FIG. 7.

First, in step S601, the CPU 103 acquires cut-out image data 603, by clipping an area at a specified position from the scanned-image data 308, by using the scanned-image data 308 stored in the storage device 121 and clipping position information 602. The cut-out image data 603 is image data obtained by clipping a rectangle having a certain or more length in a direction parallel to the reading line in scanning, from image data obtained by scanning a chart. For example, for the image data obtained by scanning the chart illustrated in FIG. 4, an area 413 is cut out as the cut-out image data 603. The area 413 has a certain or more length in the first direction 410 of the chart, and is obtained by a blank part of the chart being read.

In step S604, the CPU 103 acquires image data of one line from the cut-out image data 603. The CPU 103 acquires a pixel value for each of pixels on a line in the direction 411 perpendicular to the reading line in scanning, for the cut-out image data 603.

In step S605, the CPU 103 performs gray scale conversion by using a monochrome coefficient 606, for the acquired image data of the one line. A streak with a color except for black may appear during scanning. Accordingly, the gray scale conversion is performed for the acquired image data of one line so that a detection method similar to that for a black streak can be performed for a color streak.

In step S607, the CPU 103 acquires a pixel value of each of the pixels included in the image data of the one line subjected to the gray scale conversion, and calculates an average value of the acquired pixel values, as a line signal value 608. In the description of the present exemplary embodiment, an average value of signal values of the respective pixels on one line is treated as the line signal value. However, the line signal value 608 is not limited to the signal value determined by the method described above. Any value may be employed if the value represents the acquired pixel values of the pixels on the one line. For example, a mode or a median of the signal values of the respective pixels on the one line may be used.

In step S609, the CPU 103 determines whether the line signal value 608 is calculated for all the lines in the cut-out image data 603. In a case where the line signal value 608 is not calculated for all the lines in the cut-out image data 603 (NO in step S609), image data for one line among the remaining lines is acquired and the processing from step S604 is repeated.

When the line signal value 608 is calculated for all the lines (YES in step S609), the processing proceeds to step S610. In step S610, the CPU 103 detects a scanner streak by using a scanner streak detection threshold 611, and acquires a scanner streak detection result 612. In step S610, a part in which the line signal value 608 is smaller than the scanner streak detection threshold 611 is detected as a streak.

In step S613, the CPU 103 outputs the scanner streak feature amount 310 by using the scanner streak detection result 612. The scanner streak feature amount 310 is a value indicating the position, width, and brightness value of the streak appeared during scanning. The scanner streak feature amount 310 is stored into the storage device 121.

The scanner streak detection processing illustrated in FIG. 7 will be further described with reference to FIGS. 4, 9A, 9B, 13A, and 13B.

Figure 9A:
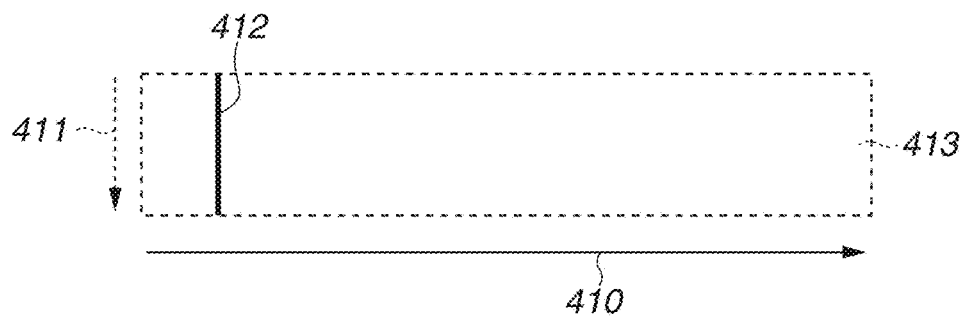
FIGS. 9A and 9B are a diagram illustrating an example of an area for detecting the streak caused by the scanner, and a diagram illustrating an example of a calculated line signal value, respectively, according to the first exemplary embodiment.
Figure 9B:
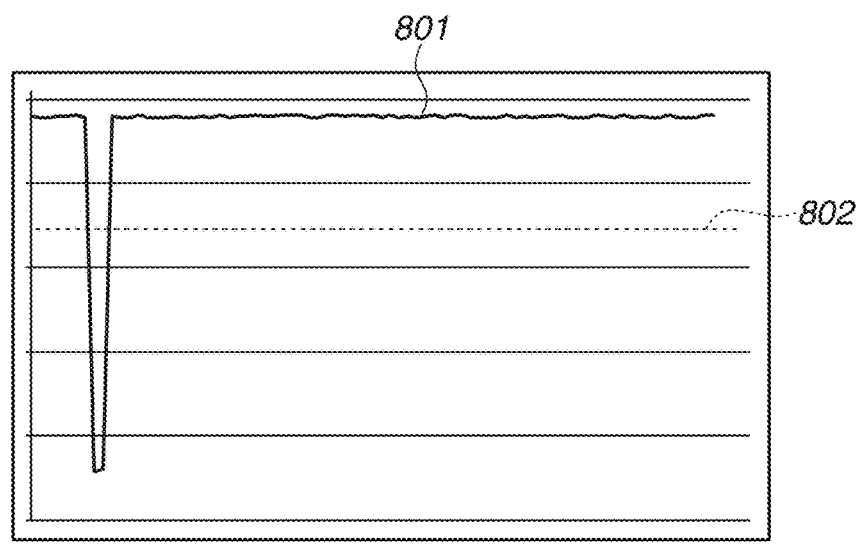

As described above, FIG. 13A illustrates the example of the chart obtained by printing the image for defection detection, and FIG. 4 illustrates the image data obtained by scanning the chart illustrated in FIG. 13A. FIG. 9A illustrates an example of the cut-out image data 603, and FIG. 9B illustrates an example of the line signal value 608 of the cut-out image data 603.

First, the CPU 103 clips an image from the image data obtained by scanning of the chart, based on the clipping position information 602. The CPU 103 clips the area 413 from the image data obtained by scanning of the chart illustrated in FIG. 4. FIG. 9A illustrates the cut-out image data 603 clipped based on the clipping position information 602, from the image data obtained by scanning of the chart.

The CPU 103 acquires a pixel value of each of pixels on one line within the area 413 in FIG. 9A. The one line includes pixels on a line in the direction 411 perpendicular to the reading line in scanning.

The CPU 103 performs the gray scale conversion on the acquired image data of the one line. For the image data subjected to the gray scale conversion, the CPU 103 acquires pixel values of the respective pixels on the one line, and calculates a line signal value based on the pixel values of the respective pixels on the one line. In the present exemplary embodiment, an average value of pixel values of the respective pixels on one line is treated as the line signal value. Without being limited to the average value of the pixel values of the respective pixels on one line, the line signal value may be any value that represents the pixel values of the respective pixels on one line. For example, a mode or a median of the signal values of the respective pixels on one line may be used.

After calculating the line signal value for the image data of the one line, the CPU 103 determines whether a line for which the line signal value is not calculated is present. In a case where a line for which the line signal value is not calculated is present, the line signal value is calculated for the remaining line.

In a case where the CPU 103 has completed the calculation of the line signal value for the all lines in the area 413, the CPU 103 obtains line signal values 801 illustrated in FIG. 9B, by aligning the calculated line signal values 608 in a direction 410 parallel to the reading direction in scanning, for the entire cut-out image data 603.

Based on the obtained line signal value 801, the CPU 103 detects an area in which a signal value falls outside a predetermined range, and determines that the detected area is a streak appearing during scanning. The CPU 103 then stores the area into the storage device 121 as the scanner streak detection result 612. As illustrated in FIG. 9B, the line signal value 801 is high in a blank part where no streak appears during scanning, whereas the line signal value 801 is low in a part corresponding to the streak. The CPU 103 detects a line in which the line signal value 801 is lower than a scanner streak detection threshold 802 as a streak, and stores the detected line into the storage device 121 as the scanner streak detection result 612.

The CPU 103 calculates streak continuity from the scanner streak detection result 612. In a case where a series of lines in each of which a streak is detected is present, the CPU 103 detects the lines as a single streak. The CPU 103 then calculates the width, position, and brightness value of each of the streaks, and stores the results of calculation into the storage device 121 as a feature amount of the streaks formed during scanning.

The method for detecting a scanner streak is not limited to the above-described example, and a known method may be employed to detect a scanner streak.

The printer streak detection processing in step S311 in FIG. 5 will be described with reference to FIG. 8.

In step S701, the CPU 103 clips an area in which a printer streak is to be detected from the scanned-image data 308, using the scanned-image data 308 stored in the storage device 121 and clipping position information 702. The CPU 103 stores cut-out image data 703 resulting from the clipping, into the storage device 121.

Figure 10A:
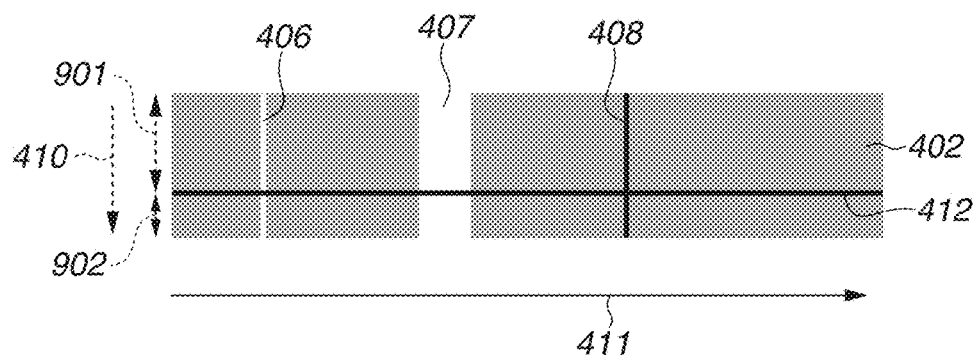
FIGS. 10A and 10B are a diagram illustrating an example of an area for detecting the streak caused by the printer, and a diagram illustrating an example of a calculated line signal value, respectively, according to the first exemplary embodiment.

For example, with the image data obtained by reading the chart illustrated in FIG. 4, a streak is detected in the areas 402 to 405. The areas 402 to 405 are formed using the Y, M, C, and K toners, respectively, and each have a toner density uniform within the area. In step S701, the CPU 103 clips any one of the areas 402 to 405. FIG. 10A illustrates an example of the cut-out image data 703 subjected to the clipping.

In step S704, the CPU 103 acquires image data of one line in the same direction as the direction 410 parallel to the reading line in scanning, for the cut-out image data 703. For example, in a case where a cut-out image illustrated in FIG. 10A is used as the cut-out image data 703, the CPU 103 acquires a pixel value of each pixel on one line in the same direction as the direction 410 parallel to the reading line in scanning.

Next, in step S705, the CPU 103 performs gray scale conversion with a monochrome coefficient 706, for the image data of the one line acquired in step S704. The gray scale conversion is performed for the acquired image data of one line, so that a streak can be detected through similar processing, for both of the areas 402 to 405 formed with the color toners of C, M, and Y, respectively, and the area 406 formed with the K toner.

In step S707, the CPU 103 calculates an average value of pixel values corresponding to pixels excluding a pixel corresponding to the scanner streak from the pixels on the one line, using the scanner streak feature amount 310. The calculated average value is a line signal value 708. Here, the scanner streak feature amount 310 indicates the position information about the streak appearing during scanning. The CPU 103 calculates the line signal value 708, by using the pixel value of each of pixels in which no streak is formed during scanning. The pixels in which no streak is formed during scanning are determined by excluding the pixel corresponding to the streak appearing during scanning (scanner streak) from the pixels on the one line by using the position information of the streak formed during scanning.

In the present exemplary embodiment, the pixel corresponding to the scanner streak is excluded from the pixels on the one line, and the average of the pixel values of the remaining pixels is calculated and used as the line signal value 708. However, the line signal value 708 is not limited to the average of the pixel values. Any value may be used if the value is based on the pixel values of the respective pixels on the line acquired by the CPU 103. For example, the line signal value 708 may be a value that represents the pixel values of the pixels on the one line, for the pixels excluding the pixel corresponding to the streak appearing during scanning from the pixels on the one line. For example, a mode or a median of the signal values of the respective pixels on the one line may be used.

In step S709, the CPU 103 determines whether the line signal value 708 is calculated for all the lines in the cut-out image data 703 resulting from the clipping. If the line signal value 708 is not calculated for all the lines (NO in step S709), the CPU 103 acquires image data of one line among the remaining lines, and repeats the processing from step S704. If the line signal value 708 is calculated for all the lines (YES in step S709), the processing proceeds to step S710. In step S710, the CPU 103 detects a printer streak with a printer streak detection threshold 711, and acquires a printer streak detection result 712.

In step S713, the CPU 103 stores the printer streak feature amount 312 into the storage device 121 using the printer streak detection result 712. Here, the printer streak feature amount 312 is a value indicating the position, width, and brightness value for each of the streaks appearing during printing. The printer streak feature amount 312 is stored into the storage device 121.

In step S714, the CPU 103 determines whether the feature amount of the streak appearing during printing is calculated for all the areas 402 to 405. If the feature amount of the streak formed during printing is not calculated for all the areas 402 to 405 (NO in step S714), the processing returns to step S701. The CPU 103 then detects a streak appearing during printing for the remaining area, and calculates the feature amount of the streak.

The printer streak detection processing in FIG. 8 will be described with reference to FIGS. 4, 10A, 10B, 13A, and 13B.

Figure 10B:
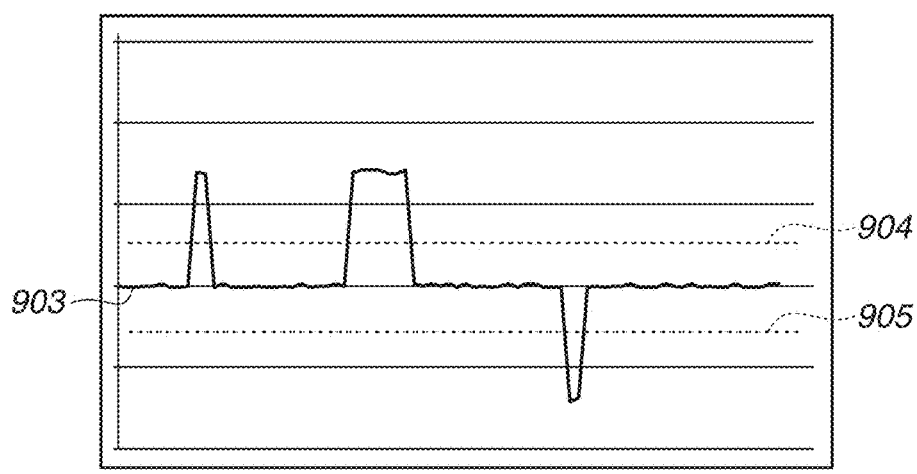

FIG. 10A illustrates an example of the cut-out image data 703, and FIG. 10B illustrates an example of the line signal value 708.

The CPU 103 clips any one of the areas 402 to 405, based on the clipping position information 702, from the image data obtained by scanning the chart illustrated in FIG. 13A. Here, a case where the area 402 is cut out is described. FIG. 10A illustrates the cut-out image data 703 obtained by clipping the area 402 from the image data obtained by scanning the chart.

The CPU 103 acquires the pixel value of each pixel on one line from FIG. 10A. The one line is a line in the same direction as the direction 410 parallel to the reading line in scanning.

The CPU 103 performs the gray scale conversion for the pixels on the one line. After the gray scale conversion, the CPU 103 sets specific pixels that include pixels in an area 901 and an area 902 except for a pixel corresponding to an area including a scanner streak 412 within the line. The line signal value 708 is determined through calculation of an average of the pixel values for specific pixels on the one line.

The line signal value 708 is calculated for all the lines within the area 402, and the calculated line signal values 708 are aligned in the direction 411 perpendicular to the reading line to obtain line signal value(s) 903 illustrated in FIG. 10B. A line signal value 903 is high in a part with a streak having a low density, such as the streak 406 and the streak 407, whereas the line signal value 903 is low in a part with a streak having a high density, such as the streak 408.

A threshold 904 and a threshold 905 in FIG. 10B are examples of the printer streak detection threshold 711. The CPU 103 performs threshold processing for the line signal value 903 of each of all the lines. In a case where the line signal value 903 of each of the lines is higher than the threshold 904 or lower than the threshold 905, the CPU 103 detects the line, as a streak.

In step S713, the CPU 103 calculates streak continuity from the detected streak information, and if a series of lines in each of which a streak is detected is present, the CPU 103 collectively detects those lines as a single streak. The CPU 103 then calculates a width, a position, and a signal value for each streak, and stores the results of such calculation into the storage device 121 as the printer streak feature amount 312.

This configuration enables the detection of a streak appearing in a direction perpendicular to the edge of a sheet leading edge during printing except for the scanner streak 412.

The method for detecting a streak appearing during printing is not limited to the above example, and a known method may be employed to detect a streak appearing during printing.

Figure 11:
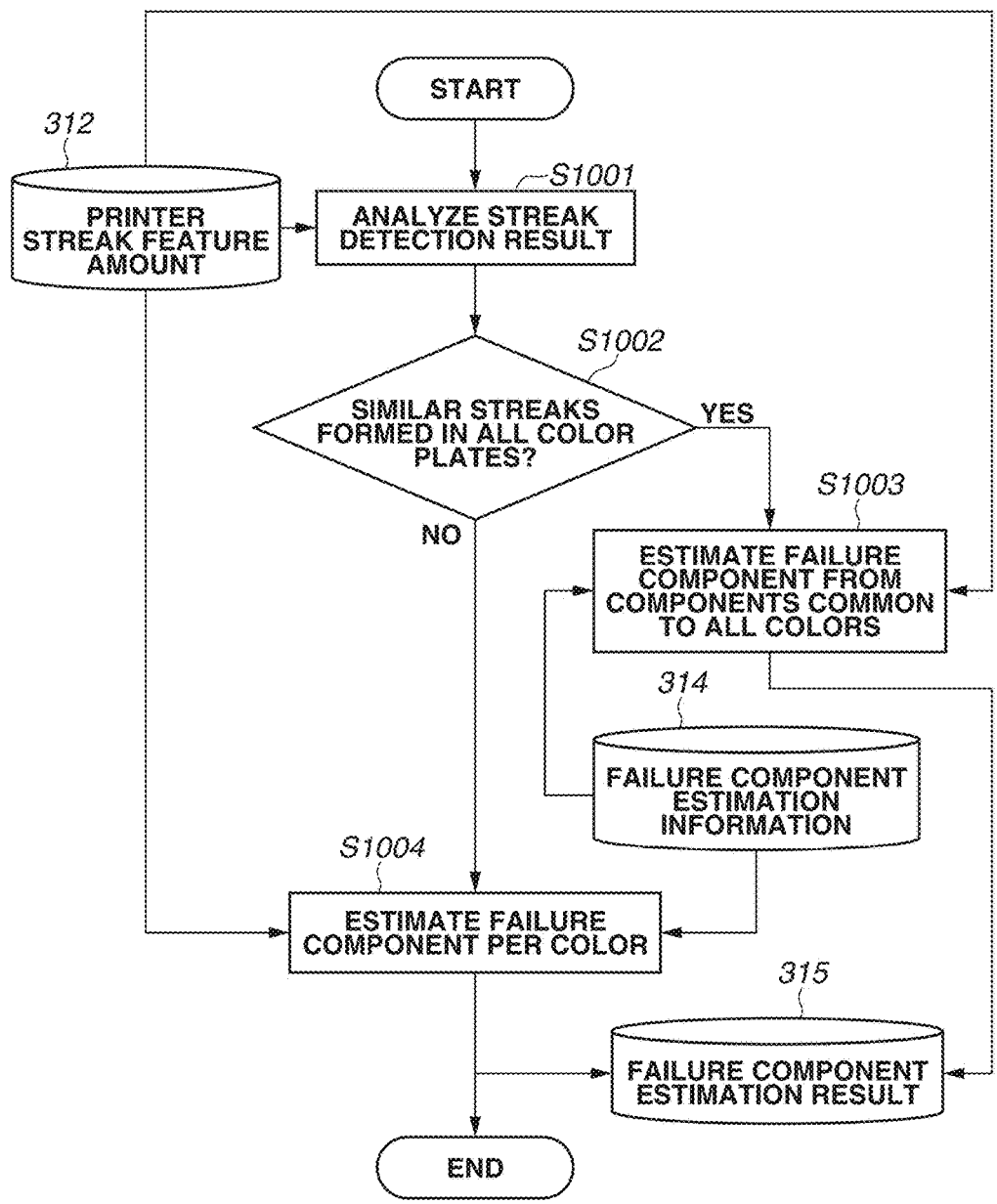
FIG. 11 is a flowchart illustrating processing for estimating a failure component, according to the first exemplary embodiment.
Figure 12A:
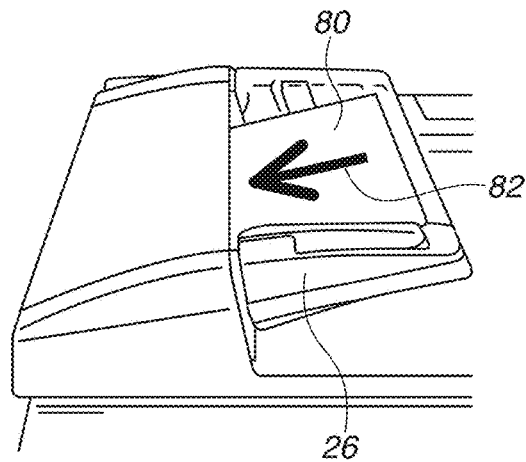
FIGS. 12A and 12B are a diagram illustrating a direction for conveying an original document in an auto document feeder (ADF), and a diagram illustrating a streak appeared during scanning, respectively.
Figure 12B:
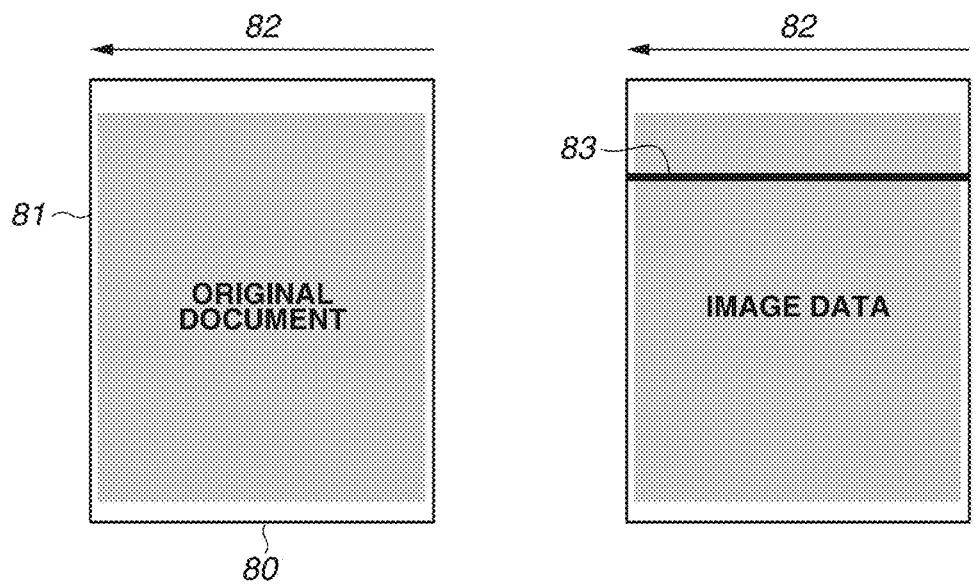

The failure component estimation processing in step S313 in FIG. 5 will be described with reference to FIG. 11.

First, in step S1001, the CPU 103 reads the printer streak feature amount 312 stored in the storage device 121, and analyzes the streak detection result. The analysis of the streak detection result indicates, for example, a method in which the CPU 103 determines whether streaks having similar features are present in a plurality of areas, by referring to the width, position, and density of a streak detected in an area formed with each of the CMYK color toners.

Next, in step S1002, the CPU 103 determines whether similar streaks are present in all the CMYK color areas. If similar streaks are present in all the CMYK color areas (YES in step S1002), the processing proceeds to step S1003. In step S1003, the CPU 103 estimates a failure component from the printer streak feature amount 312 and the failure component estimation information 314 stored in the storage device 121. In the failure component estimation information 314, components of the printer 115 and streak feature amounts at occurrence of failure are stored in association with each other. If streaks are common in areas formed with the respective color toners, the CPU 103 estimates a failure component by referring to components commonly used for all the colors in forming an image, such as a fixing component and a transfer drum. The estimated failure component is then output as the failure component estimation result 315.

If the CPU 103 determines that similar streaks are not present in all the CMYK color areas (NO in step S1002), the processing proceeds to step S1004. In step S1004, the CPU 103 estimates a failure component per color, from the printer streak feature amount 312 and the failure component estimation information 314. The CPU 103 estimates a component causing a defection by referring to color-dependent components, such as a process unit, in the failure component estimation information 314, and outputs the estimated component as the failure component estimation result 315.

The processing illustrated in FIGS. 10A and 10B, the CPU 103 enables estimation of a component or a unit causing a defection such as a streak appearing during printing.

In the description of the present exemplary embodiment, the controller 102 in the MFP 101 performs the processing according to each of FIGS. 5, 7, 8, and 11. However, the scanned-image data 308 may be transmitted to an external server or computer so that the external server or computer may perform streak detection processing and failure component estimation.

In the description of the present exemplary embodiment, the flow reading mode is used in scanning. However, any type of scanning mode may be employed if a streak appears in a certain direction. For example, the present exemplary embodiment is applicable to a case where a chart is placed on the document platen glass 57 provided to the MFP 101, and the image reading unit 35 reads the chart placed on the document platen glass 57 while moving.

In the description of the present exemplary embodiment, the streak extending in the direction parallel to the first direction of the chart is detected. However, an abnormality other than a streak may be detected. Furthermore, other types of defection may be detected, including dotted or linear density non-uniformity, color problems concerning a print product, and toner scatter in fixing.

Figure 14:
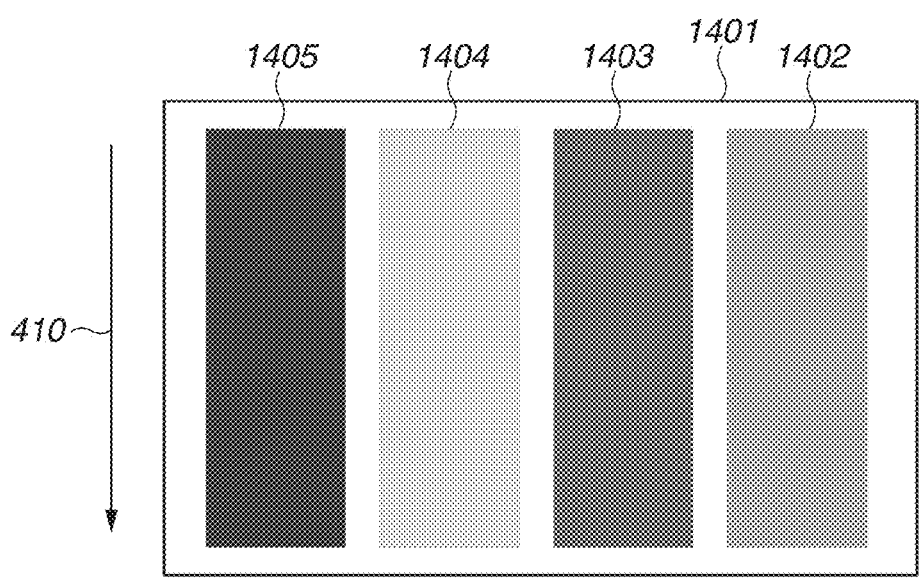
FIG. 14 is a diagram illustrating an example of a chart for detecting a streak image extending in a direction perpendicular to a first direction, according to the first exemplary embodiment.

In the description of the present exemplary embodiment, the streak extending in the direction parallel to the first direction of the chart is detected. However, in some cases, a streak appears in a direction perpendicular to the first direction 410 during printing, due to dirt on various rollers, such as a charging roller. To detect such a streak, for example, image data having areas 1402 to 1405 as illustrated in FIG. 14 is printed and used as a chart. The areas 1402 to 1405 correspond to the areas 402 to 405 turned 90 degrees. In such a case, a placement orientation in which a direction perpendicular to the first direction is the reading direction is notified to prevent a streak appearing during scanning from being perpendicular to the first direction. For example, in the case of a chart printed with "A4" setting, a sheet size for scanning this chart is set to "A4".

In the present exemplary embodiment, notifying a user of the sheet size for scanning the chart can prevent a streak in a direction perpendicular to the reading line to appear during scanning from appearing in the same direction as a streak appearing in a predetermined direction during printing. This configuration can prevent the streak appearing in the predetermined direction during printing and the streak to appear in the direction perpendicular to the reading line during scanning from appearing on the same straight line. Moreover, this configuration facilitates extraction of the streak appearing in the above-described direction during printing from image data obtained by scanning the chart, so that accuracy of estimating a failure component of the printer can be enhanced.

In the present exemplary embodiment, the streak appearing in the above-described direction during printing can be detected from image data obtained by scanning a single sheet of the chart. This configuration excludes a need for a user to prepare and scan a blank sheet in addition to the chart, or to prepare image data corresponding to the scanned blank sheet, in detection of a streak appearing in the first direction during printing.

Other Exemplary Embodiments

In exemplary embodiments, the screen for notifying the placement orientation of the chart is displayed on the touch panel, to notify a user of how to place the chart. Alternatively, the placement orientation for scanning the chart may be printed on the chart beforehand. With this configuration, the user can recognize how to place the chart, by looking at the printed chart.

According to exemplary embodiments, when placing a printed chart on the sheet feeding tray or the platen glass of the scanner, the user can place the chart in such a manner that a streak appearing in a predetermined direction during printing and a streak to appear in a direction perpendicular to a reading line during scanning do not appear in the same direction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091621, filed Apr. 28, 2016, which is hereby incorporated by reference herein in its entirety.

What is claimed is:

1. An image forming apparatus comprising:
   a printer that prints a predetermined pattern image on a sheet;
   a controller that provides a notification of an orientation for placing, on a placement portion, the sheet on which the predetermined pattern image is printed by the printer; and
   a scanner that scans, on a line to line basis, the sheet on which the predetermined pattern image is printed and which is placed on the placement portion, to generate image data,
   wherein the controller detects a streak-shaped image extending in a direction along a predetermined edge of the sheet, by analyzing the image data generated by scanning the sheet by the scanner, and
   wherein the controller provides a notification of a placement orientation for allowing the scanner to scan, on a line to line basis, the sheet on which the predetermined pattern image is printed, the line extending in a direction along the predetermined edge.

2. The image forming apparatus according to claim 1, further comprising a display,
   wherein the controller causes the display to display an orientation for placing the sheet on the placement portion, after the printer prints the predetermined pattern image on the sheet.

3. The image forming apparatus according to claim 1, wherein the controller causes the scanner to scan the sheet according to a scan instruction received from a user.

4. The image forming apparatus according to claim 1, wherein the printer prints the predetermined pattern image having areas each formed with toner of a different one of CMYK colors.

5. The image forming apparatus according to claim 1, wherein the controller estimates a cause of the streak-shaped image in the printed predetermined pattern image, based on a feature amount of the detected streak-shaped image.

6. The image forming apparatus according to claim 5, further comprising a network interface that transmits the cause estimated by the controller to an external information processing apparatus.

7. The image forming apparatus according to claim 5, wherein the controller estimates the cause, based on the feature amount indicating at least one of a formed position, a width, and a pixel value of the streak-shaped image.

8. The image forming apparatus according to claim 1, wherein the controller clips a predetermined area of the image data obtained by the scanner scanning the sheet on which the predetermined image is formed, calculates a representative value of pixel values for each line in a direction along the predetermined edge, and detects a line in which the representative value is not included in a predetermined range, as the streak-shaped image.

9. The image forming apparatus according to claim 8, wherein the controller sets, as the representative value, an average of pixel values of pixels included in one line in a direction along the predetermined edge.

10. The image forming apparatus according to claim 1, wherein the scanner scans the image formed on the sheet while the scanner is moving the sheet placed on the placement portion in a direction perpendicular to a reading line along which the scanner scans the sheet.

11. The image forming apparatus according to claim 1, wherein the sheet has the predetermined edge and an edge perpendicular to the predetermined edge, and wherein the printer prints the predetermined pattern image by conveying the sheet with the edge perpendicular to the predetermined edge as a leading edge.

12. An image processing system comprising:
an image forming apparatus; and
an information processing apparatus,
wherein the image forming apparatus includes
a printer that prints a predetermined pattern image on a sheet,
a first controller that provides a notification of an orientation for placing, on a placement portion, the sheet on which the predetermined pattern image is printed by the printer,
a scanner that scans, on a line to line basis, the image formed on the sheet on which the predetermined pattern image is printed and which is placed on the placement portion, to generate image data, and
a network interface that transmits the image data generated by scanning the sheet by the scanner, to the information processing apparatus,
wherein the information processing apparatus includes a second controller that detects a streak-shaped image extending in a direction along a predetermined edge of the sheet, by analyzing the image data received from the image forming apparatus, and
wherein the first controller provides a notification of a placement orientation for allowing the scanner to scan, on a line to line basis, the sheet on which the predetermined pattern image is formed, the line extending in a direction along the predetermined edge.

13. A method for controlling an image processing apparatus, the control method comprising:
printing, by a printer a predetermined pattern image on a sheet;
providing, by a controller, a notification of an orientation for placing, on a placement portion, the sheet on which the predetermined pattern image is printed in the printing step;
scanning, by a scanner and on a line to line basis, the sheet on which the predetermined pattern image is printed and which is placed on the placement portion to generate image data; and
detecting, by the controller, a streak-shaped image extending in a direction along a predetermined edge of the sheet, by analyzing the image data generated by scanning the sheet in the scanning step,
wherein, in the providing step, a notification of a placement orientation for allowing the sheet, on which the predetermined pattern image is printed, to be read on a line to line basis, the line extending in a direction along the predetermined edge, is provided by the controller.

14. A non-transitory computer readable storage medium storing a program for executing a control method for controlling an image processing apparatus, the control method comprising:
printing, by a printer, a predetermined pattern image on a sheet;
providing, by a controller, a notification of an orientation for placing, on a placement portion, the sheet on which the predetermined pattern image is printed in the printing step;
cading scanning, by a scanner and on a line to line basis, the sheet on which the predetermined pattern image is printed and which is placed on the placement portion to generate image data; and
detecting, by the controller, a streak-shaped image extending in a direction along a predetermined edge of the sheet, by analyzing the image data generated by scanning the sheet in the scanning step,
wherein, in the providing step, a notification of a placement orientation for allowing the sheet, on which the predetermined pattern image is printed, to be read on a line to line basis, the line extending in a direction along the predetermined edge, is provided by the controller.

* * * * *